Figure 1:
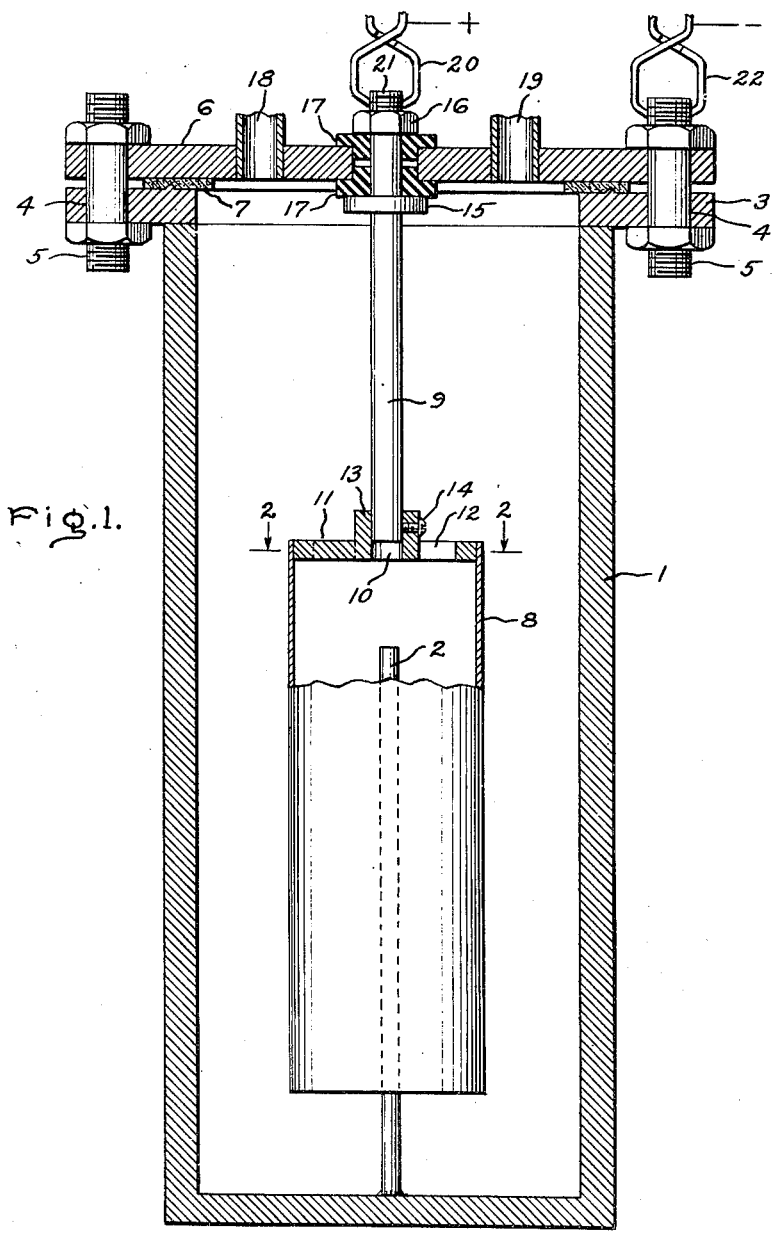

Inventor:
John K. Wolfe,
by [signature]
His Attorney.

Patented June 17, 1952

2,601,014

UNITED STATES PATENT OFFICE 2,601,014

PREPARATION OF FLUORINATED CHLORO-
CARBON COMPOUNDS

John K. Wolfe, Burnt Hills, N. Y., assignor to
General Electric Company, a corporation of
New York Application August 17, 1949, Serial No. 110,705

6 Claims. (Cl. 204—59)

This invention is concerned with the preparation of fluorinated organic compounds. More particularly, the invention relates to a process for making fluorine-containing compounds from a chlorocarbon compound containing a carbon-bonded hydrogen, which process comprises electrolyzing the latter compound with hydrogen fluoride under anhydrous conditions to give a compound containing a carbon-bonded fluorine in place of the carbon-bonded hydrogen.

One of the objects of this invention is to prepare fluorochlorohydrocarbons easily and economically.

Another object of the invention is to prepare difluorodichloromethane ($CF_2Cl_2$ known as Freon-12) from chloromethanes containing a carbon-bonded hydrogen.

A further object of the invention is directed to the preparation of difluorochloromethane ($CHF_2Cl$ known as Freon-22).

A still further object of the invention is to prepare easily various fluorochlorohydrocarbons which have heretofore been prepared only with the greatest difficulty and in many instances have not been prepared at all.

Other objects of the invention will become more apparent as the description thereof proceeds.

Because of its position in the electromotive series, it has been believed that fluorine will replace chlorine before it will replace hydrogen where both the chlorine and the hydrogen are attached to carbon atoms in the same chemical compound. This order of replacement was more expected where severe conditions employing hydrogen fluoride were used in connection with chlorohydrocarbons.

Unexpectedly, I have discovered that I can introduce fluorine into a chlorohydrocarbon containing a carbon-bonded hydrogen and substitute the hydrogen first with fluorine and obtain under some conditions only partial removal of chlorine. By means of my invention it is possible to obtain substantial yields of fluorochlorocarbon compounds in which no chlorine has been replaced with fluorine. It is believed that the removal of hydrogen from a chlorohydrocarbon occurs in stepwise fashion and that the partial replacement of chlorine with fluorine is a secondary reaction on the products formed. This discovery was entirely unobvious and in no way could have been predicted from prior reactions involving the replacement of chlorine with fluorine in chlorinated compounds using electrolysis methods.

In accordance with my invention, a mixture of the chlorocarbon compound and anhydrous hydrogen fluoride is prepared and an electric current put through the mixture using an electrolytic cell as the medium for the reaction. In carrying out the reaction, I have found it desirable to employ an electrolyte such as, for instance, anhydrous lithium fluoride, sodium fluoride, potassium fluoride, etc., in the cell to facilitate the reaction. However, the latter intentionally added electrolyte may be omitted if desired, but longer periods of time are then required to obtain the same degree of conversion than when the electrolyte is present.

Figure 2:
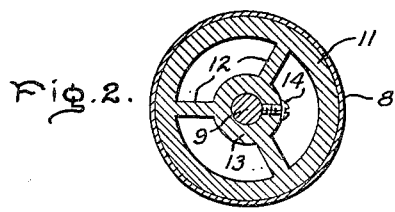

A cell which I have found can be employed with good results is disclosed in the accompanying drawing comprising Figs. 1 and 2. In Fig. 1, the outer casing 1 of the cell, which is the cathode in the cell and is made of welded, cold-rolled steel, has attached to it a thin rod 2 extending upwardly from the center of the bottom of the casing. The lip 3 of the casing contains a series of perforations 4 large enough to hold fittings 5 which are used to clamp in place the cover 6 of the cell casing. An inert ring 7, preferably made from polytetrafluoroethylene or polychlorotrifluoroethylene, is used as a gasket to act as a seal between the cover and the casing.

The anode 8 comprises a nickel cylinder mounted in the center of the cell casing. A positioning rod 9 passes through the opening 10 of the anode which is centered by means of a support collar 11 (shown as a complete unit in Fig. 2 which is a cross-sectional view), having radiating ribs 12 to the periphery. An extension 13 of the collar has a set screw 14 positioned in it to fasten the anode to the positioning rod. A cross-sectional view of this collar with the ribs and set screw is shown in Fig. 2. The positioning rod 9 is fitted with a welded flange 15 and a threaded nut 16. Electrical insulation of the positioning rod (and thereby the anode) from the cell cover and casing (cathode) is made by the use of inert bushings 17 constructed of polytetrafluoroethylene or polychlorotrifluoroethylene. A sealable inlet port 18 is provided for introduction of starting materials and an outlet port 19 is provide for the escape of gaseous products.

A clamp 20 is attached to the anode at the top 21 of the threaded portion of the positioning rod and the cathode clamp 22 is connected to the cell casing at an appropriate point as, for example, the fitting 5. The construction of the anode assembly is entirely of nickel to minimize corrosion due to anhydrous hydrogen fluoride and electrolysis reactions.

In practicing my invention, the cell with the anode in place, as shown in the accompanying drawing, is filled preferably to a level above the top of the anode with anhydrous hydrogen fluoride. The anhydrous electrolyte, for instance, anhydrous lithium fluoride, is then introduced and thoroughly mixed with the hydrogen fluoride to form a homogeneous solution. The anhydrous electrolyte may, of course, be added before the cell cover is put in place, and the hydrogen fluoride added through the inlet port of the cover. The chlorohydrocarbon containing the carbon-bonded hydrogen is then introduced through the inlet port in the cover of the cell casing, the cover being completely closed thereafter with the exception of another port for the removal of gaseous reaction products. Thereafter, enough current is passed through the cell during the electrolysis to obtain the desired conversion of the starting materials.

The conditions under which the reaction may be conducted can be varied within wide limits without departing from the scope of the invention. Generally, when my claimed reaction is conducted at atmospheric pressure, I advantageously employ temperatures of the order from about −78° C. to +19° C., preferably from −35° C. to +10° C. As a result of my work, the evidence indicates that the lower the temperature used during the reaction, the more complete is the replacement of hydrogen with the fluorine before substantial replacement of chlorine ensues while higher temperatures encourage, in addition to replacing the hydrogen, increased replacement of the chlorine with fluorine.

The amperage and voltage used in the electrolysis reaction may also be varied for different lengths of time. I have found it advantageous to use from about 3 to 7 volts during my claimed process. The amperage in the cell depends on the conducting surface area of the anode, the nature of the electrolyte, and the solubilities of the electrolyte with the chlorocarbon compound, e. g., chlorohydrocarbon, in the anhydrous hydrogen fluoride. It is also apparent that the amperage will depend largely on the size of the cell. The time within which the electrolysis is conducted will vary depending upon the above-stated factors and degree of conversion desired. As will be obvious to those skilled in the art, all these conditions may be modified without departing from the scope of the claimed invention. The products of the reaction, together with the formed hydrogen, are passed through various absorbing, scrubbing and other purifying agents. The gaseous products are advantageously collected in a low temperature trap, for instance, Dry Ice (solid carbon dioxide) and liquid air traps. Distillation of the reaction products to separate the individually formed components may be made through a low temperature distillation column, e. g., a Podbielniak column.

To insure that the hydrogen fluoride is substantially anhydrous, an independent electrolysis is conducted in the cell with electrolyte and commercial anhydrous hydrogen fluoride alone, prior to the admission of the chlorocarbon compound. A voltage of from 6 to 10 volts is impressed across the cell until substantially all traces of moisture are removed as $OF_2$ and hydrogen, and molecular fluorine can be detected in the effluent gases.

In order that those skilled in the art better may understand how the present invention may be practiced, the following examples are given by way of illustration and not by way of limitation.

EXAMPLE 1

The cell described in the accompanying drawing was charged with the following ingredients:

850 cc. anhydrous hydrogen fluoride
40 grams anhydrous LiF
24 grams $CH_2Cl_2$

The temperature within the cell was maintained at around −10° C. The cell was electrolyzed using about 5.9 volts, while the amperage ranged from approximately 2.3 to 2.8 amperes. Since it was calculated that an average of 2.4 amperes was employed for 8¼ hours during which the reaction was conducted, it is apparent that there were used 19.8 ampere hours. The products of the reaction, together with the hydrogen formed, were passed over solid sodium fluoride pellets, bubbled through an aqueous sodium sulfite solution containing potassium iodide, and finally through concentrated sulfuric acid. The reaction products were then collected in Dry Ice and liquid air traps from which all the formed hydrogen escaped. The remaining reaction products were then distilled through a low temperature Podbielniak distillation column (having an accuracy of ±1° C. over most of the distillation range) to give the following identified compounds in the proportions shown in Table I.

Table I

| Compound | B. P. °C. (762 mm.) | Per Cent Of Total Gas |
|---|---|---|
| $CF_4$ | −128 | 2.3 |
| Mixture of $CF_3Cl$ and $CF_3H$ | −88 | 13.3 |
| $CF_3H$ | −82 | 8.6 |
| $CH_2F_2$ | −53 | 6.9 |
| $CHClF_2$ | −40 | 18.5 |
| $CCl_2F_2$ | −30 | 23.6 |
| $CHFCl_2$ | +9 | 13.1 |
| $CCl_3F$ | −10 (200 mm.) | 13.7 |

The products represented in Table I were identified by boiling point and vapor density measurements. In many cases where there was doubt as to the product, it was analyzed in a mass spectrometer and compared with known material.

EXAMPLE 2

In this example the same materials were employed as in Example 1, while the temperature during the reaction was controlled at about 0° C. The amperage of the cell was from 0.8 to 1.9, showing an average of 1.8 amperes over the 11-hour period during which the reaction was allowed to proceed, making a total of 19.8 ampere hours. The gases resulting from the reaction were passed through the same purification train as described in Example 1 and distilled in the Podbielniak column. The products obtained are listed below in Table II. The cell was charged with the following ingredients:

850 cc. anhydrous hydrogen fluoride
40 grams anhydrous LiF
24 grams $CH_2Cl_2$

Table II

| Compound | B. P. °C. (761 mm.) | Per Cent Of Total Gas |
|---|---|---|
| $CF_4$ | −124 | 2.9 |
| Mixture of $CF_3Cl$ and $CF_3H$ | −88 | 4.9 |
| $CF_3H$ | −82 | 9.9 |
| $CH_2F_2$ | −54 | 6.0 |
| $CHF_2Cl$ | −40 | 22.4 |
| $CF_2Cl_2$ | −30 | 3.8 |
| $CH_2FCl$ | −9 | 15.7 |
| $CHFCl_2$ | +9 | 33.7 |
| $CCl_3F$ | −23 (99 mm.) | 0.7 |

EXAMPLE 3

This example illustrates the effect of electrolyzing a mixture of ingredients using chloroform (CHCl₃) as the chlorinated hydrocarbon containing the carbon-bonded hydrogen. The temperature was maintained at around −2° C., and the cell was electrolyzed at approximately 5.9 volts. The amperage ranged from 1.5 to 3.0 and showed an average of 2.0 amperes in 8 hours, giving a total of 16 ampere hours. The products of the reaction were passed over the purifying train previously described and were collected in Dry Ice and liquid air traps. The distillation of the products was accomplished with a low temperature Podbielniak distillation column and the compounds obtained are shown in Table III. The charge in the electrolytic cell was as follows:

900 cc. anhydrous HF
40 grams anhydrous LiF
31.5 grams CHCl₃

*Table III*

| Compound | B. P. ° C. (758 mm.) | Per Cent Of Total Gas |
|---|---|---|
| CF₄ | −125 | 1.6 |
| Mixture of CF₃H and CF₂Cl 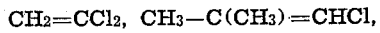 | −90 to −86 | 27.4 |
| CF₃Cl | −80 | 5.1 |
| CHF₂Cl | −40 | 12.0 |
| CF₂Cl₂ | −29 | 40.0 |
| CHFCl₂ | +9 | 4.4 |
| CFCl₃ | +6.5 (400 mm.) | 9.5 |

It will, of course, be apparent to those skilled in the art that in addition to the chlorohydrocarbons employed in the previous examples, other chlorohydrocarbons can be used without departing from the scope of the invention. Among such compounds may be mentioned CH₃Cl, C₂H₅Cl, C₂H₄Cl₂ (ethylene dichloride and its isomers), C₂H₃Cl₃ (including its isomers), C₂H₂Cl₄ (including its isomers), C₂HCl₅, CH₂=CHCl, CHCl=CCl₂, CH₂=CCl₂, CH₃—C(CH₃)=CHCl, CCl₃—CH=CH₂, CCl₃—C(CH₃)=CH₂, C₃H₆Cl₂, C₃H₄Cl₄, etc. It will also be apparent that in addition to the chlorohydrocarbons consisting of carbon, hydrogen and chlorine mentioned above, other chlorohydrocarbons containing, in addition, fluorine atoms attached to carbon may also be used. As examples of such compounds may be mentioned CHFCl₂, CH₂FCl, CH₃CF₂Cl, etc. Although the foregoing as well as many other chlorohydrocarbons may be employed in the practice of my invention, I have found it advantageous to use as a starting material, that is, the chlorohydrocarbon, one which together with its reaction products has such a boiling point range that the products are evolved from the cell as they are formed and most of the starting materials remain behind for further electrolysis. For instance, this fact is evident in connection with the electrolysis of methylene chloride (CH₂Cl₂—B. P. 40.1° C.) and chloroform (CHCl₃—B. P. 61.26° C.) where the major products are gases at cell operating temperatures, and the starting materials are liquids.

The amount of ingredients used in my claimed process, i. e., the hydrogen fluoride, electrolyte, and chlorocarbon compound, e. g., chlorohydrocarbon, may be varied within wide limits depending on the desired conductance in the cell. This conductance has been discussed generally above. The amount of electrolyte used is advantageously that which is substantially completely soluble in the mixture of anhydrous hydrogen fluoride and chlorohydrocarbon used. For instance, anhydrous LiF is soluble in anhydrous hydrogen fluoride but is much less soluble in chlorohydrocarbons, and as the proportion of chlorohydrocarbon in anhydrous hydrogen fluoride increases, the solubility of LiF in the mixture and conductance of the cell decrease. The minimum amount of hydrogen fluoride advantageously used is that stoichiometrically required for the desired conversion. The foregoing examples are indicative of the proportion of ingredients which may be used and are not intended to be limiting in their disclosures.

My discovery is eminently suitable for making easily and economically fluorochloro compounds which find utility as refrigerants, for example, CF₂Cl₂ and CHF₂Cl. In addition, it is possible also, by means of my process, to prepare easily fluorochloro derivatives which heretofore have been obtained only with the greatest difficulty and, in many instances, the preparation of which has not been known. Fluorochloroethanes prepared by my process can be dehydrohalogenated or dehalogenated to give interesting polymerizable monomers which in turn can be polymerized to give polymeric materials such as, for example, polymers of chlorotrifluoroethylene which have good heat stability, high softening point, and good chemical resistance.

Finally, my claimed process permits the preparation more easily of fluorochlorocarbon compounds which have desirable temperature ranges and which make them suitable for low temperature refrigeration. The use of these compounds as refrigerants has been limited heretofore because of the difficulty of preparation by previously known methods.

In my claimed process, although the examples disclose batch operation, certain distinct features allow continuous operation to be easily employed. One recommendation is the fact that, in many instances, substantially atmospheric pressures can be employed throughout, although reactions using superatmospheric pressures are also included within the scope of my claimed invention. When superatmospheric pressures are employed, higher temperatures than 19° C. as used at atmospheric pressure reactions may be employed. Thus, when working with compounds where boiling points are above that of hydrogen fluoride and whose electrolysis products with hydrogen fluoride also boil above that of hydrogen fluoride, temperatures as high as 50° C., preferably from 20° to 35° C., may be employed without departing from the scope of the claimed invention. In addition, most of the products of the reaction, especially in the case of single carbon compounds, are highly volatile gaseous products at cell-operating temperatures and the chlorohydrocarbon being electrolyzed is generally a relatively non-volatile liquid at these same operating temperatures. It is therefore apparent that continuous addition of chlorohydrocarbon and anhydrous hydrogen fluoride could be made concurrently with the evolution of the reaction products.

Chlorohydrocarbons containing two or more carbon atoms will for the most part yield liquid products which generally are non-volatile at temperatures of the operating cell, and a continuous process for the production of these high boiling fluorochlorocarbon compounds may be accomplished by continuous withdrawal of the electrolysis mixture and an external separation of the starting materials from the hydrogen fluoride and the liquid reaction products. The anhydrous hydrogen fluoride and starting materials separated in this manner from the formed products are continuously returned to the electrolysis cell.

What I claim as new and desire to secure by Letters Patent of the United States is:

1. The process for making fluorine-containing chlorocarbon compounds from a chlorohydrocarbon consisting solely of carbon, hydrogen and chlorine and containing carbon-bonded hydrogen, which process comprises electrolyzing the aforesaid chlorohydrocarbon in liquid anhydrous HF to produce a mixture comprising essentially chlorofluorocarbon compounds in which are present carbon-bonded fluorine atoms in place of carbon-bonded hydrogen atoms present in the starting chlorohydrocarbon, the said chlorofluorocarbon compounds containing the same number of carbon atoms as the chlorohydrocarbon reactant.

2. The process for preparing fluorine-containing chlorocarbon compounds from a chlorohydrocarbon consisting solely of carbon, hydrogen and chlorine and containing carbon-bonded hydrogen, which process comprises forming a mixture of ingredients comprising (1) a chlorohydrocarbon described above, (2) liquid anhydrous hydrogen fluoride and (3) an electrolyte, and thereafter passing a current through the mixture for a time sufficient to effect conversion of the aforesaid chlorohydrocarbon to a mixture comprising essentially of fluorine-containing chlorocarbon compounds in which there are present carbon-bonded fluorine atoms in place of carbon-bonded hydrogen atoms present in the starting chlorohydrocarbon, the said fluorine-containing chlorocarbon compounds containing the same number of carbon atoms as the chlorohydrocarbon reactant.

3. The process for making fluorine-containing chlorocarbon compounds from a chlorohydrocarbon consisting solely of carbon, hydrogen and chlorine and containing carbon-bonded hydrogen, which process comprises electrolyzing methylene chloride in liquid anhydrous HF in the presence of an electrolyte to produce a mixture comprising essentially $CHF_2Cl$, $CH_2FCl$, and $CHFCl_2$.

4. The process for preparing fluorine-containing chlorocarbon compounds from a chlorohydrocarbon consisting solely of carbon, hydrogen and chlorine and containing carbon-bonded hydrogen, which process comprises electrolyzing chloroform in liquid HF in the presence of an electrolyte to produce a mixture comprising essentially $CFCl_3$, $CF_2Cl_2$, $CHF_2Cl$, and $CF_3Cl$.

5. The process for preparing fluorine-containing chlorocarbon compounds from a chlorohydrocarbon consisting solely of carbon, hydrogen and chlorine and containing carbon-bonded hydrogen, which process comprises electrolyzing at about 0° C. methylene chloride in liquid anhydrous HF in the presence of lithium fluoride as an electrolyte to produce a mixture comprising essentially $CHF_2Cl$, $CH_2FCl$, and $CHFCl_2$.

6. The process for making fluorine-containing chlorocarbon compounds from a chlorohydrocarbon consisting solely of carbon, hydrogen and chlorine and containing carbon-bonded hydrogen, which process comprises electrolyzing chloroform in liquid anhydrous HF in the presence of lithium fluoride to produce a mixture comprising essentially $CFCl_3$, $CF_2Cl_2$, $CHF_2Cl$, and $CF_3Cl$.

JOHN K. WOLFE.

REFERENCES CITED

The following references are of record in the file of this patent:

UNITED STATES PATENTS

| Number | Name | Date |
|---|---|---|
| 2,186,917 | Gaylor | Jan. 9, 1940 |
| 2,519,983 | Simons | Aug. 22, 1950 |

OTHER REFERENCES

Simons, Chemical Reviews, vol. 8 (1931), pages 223–230.

Simons, et al., Journal Electrochemical Society, vol. 95 (February 1949), pages 64–67.